US006146303A

United States Patent [19]

Wittur et al.

[11] Patent Number: 6,146,303

[45] Date of Patent: Nov. 14, 2000

[54] DRIVE UNIT FOR A HOIST

[75] Inventors: Horst Wittur, Karlsfeld-Rothschwaige; Hubert Fisher, Munich, both of Germany

[73] Assignee: Wittur AG, Germany

[21] Appl. No.: 08/544,396

[22] Filed: Oct. 10, 1995

[30] Foreign Application Priority Data

Oct. 10, 1994 [DE] Germany ........................ 94 16 306 U

[51] Int. Cl.[7] ........................ F16H 57/02

[52] U.S. Cl. ........................ 475/149; 74/606 R; 188/170

[58] Field of Search ........................ 74/606 R; 188/78, 188/74; 475/149; 254/299

[56] References Cited

U.S. PATENT DOCUMENTS

| | | | |
|---|---|---|---|
| 3,901,478 | 8/1975 | Peterson | 188/71.2 X |
| 3,967,706 | 7/1976 | King | 188/170 |
| 3,995,722 | 12/1976 | Jones et al. | 188/170 X |
| 4,116,308 | 9/1978 | Sever | 188/75 X |
| 4,161,126 | 7/1979 | Winzeler | 475/149 X |
| 4,588,057 | 5/1986 | Weich et al. | 188/72.4 X |
| 5,141,085 | 8/1992 | McCormick | 188/72.7 X |
| 5,435,209 | 7/1995 | Wittur | 74/606 R |
| 5,909,783 | 6/1999 | Berish | 182/146 |

*Primary Examiner*—Khoi Q. Ta

*Attorney, Agent, or Firm*—Price, Heneveld, Cooper, DeWitt & Litton

[57] ABSTRACT

The objective of the invention is a drive unit for a hoist, in particular for a hoist consisting of a motor 3, a gear 1, a brake 2, and a brake housing 8 serving as support, onto which the facing of the motor and/or the gear is flanged. The drive unit has a shaft 6, which simultaneously serves as a motor shaft and as a gear shaft, and the brake body 2 within the brake housing 8 is fastened to the shaft. Preferably, the motor 3 and/or the gear 1 are flanged, unsupported, to both sides of the brake housing 8. The construction according to the invention significantly shortens the total length of the drive unit. Furthermore, the installation and assembly costs in money, time, and materials are decreased.

11 Claims, 3 Drawing Sheets

DRIVE UNIT FOR A HOIST

BACKGROUND OF THE INVENTION

This invention pertains to a drive unit for a hoist, especially for a hoist as set forth in the ain definition of claim 1.

In a familiar drive unit of this sort (WO 89/1146), the drive shaft, extending through the rake housing, consists of three parts, which are linked together with two couplings. One of hose couplings is formed by the disk brake carrier, which contains a brake disk in one-unit construction. The three-part drive unit with the two drive couplings, one of which also contains a length adjustment, enlarges the length of the drive unit construction, increases the mass of the revolving parts, and heightens the risk of vibrations.

SUMMARY OF THE INVENTION

The invention has the objective of devising a drive unit of the variety initially described, so that, with simple construction, it exhibits smaller construction length and lower inertial forces. The objective is solved by the features of claim 1, while further claims represent additional advantageous configurations.

Because the engine shaft and the drive shaft are a continuous shaft and form a singular unit and because the body of the brake is fastened to the shaft within the brake housing, the total length of the drive unit can be significantly shortened, which represents an essential advantage under the usually restricted installation conditions for hoist drives. Moreover, the installation and the assembly costs in money, time, and materials are reduced.

By preference, the motor and the drive are flanged and unsupported on both sides to the brake housing. Thus, they form an assembly unit, which can be pre-assembled and will not require any additional alignment during the installation into the hoist, but must be fastened to the foundation as a single unit. Depending on the design of the drive, it can also be flanged to brake housing with the power take-off side and joined to the motor at the driving end.

The brake body can be constructed as a drum brake or a disk brake, or, if necessary, be built according to any other structural design. Then the parts absorbing the brake forces are either fastened to the brake housing or to a special support.

A flange or a cone clutch is the preferred method of attaching the brake body, e.g., the brake drum or the brake disk, to the continuous shaft, so that a partial or complete brake change is possible without exorbitant costs in money, time, and materials. Access is further improved by openings in the brake housing to make the brake easily accessible.

If a planetary gear is used as a drive, the best fastening method is flanging it to the brake housing on the side opposite from the motor. Then the housing of the planetary gear can be designed as a pulley for the ropes of the hoist projecting into the hoist shaft, which results in a further reduction in construction size.

The method of using a flange for attaching the drive, as specified by the invention, permits, in an advantageous way, also the use of other varieties of drives, such as spur gears, precision gears with zero backlash, and combination gears. At the same time, the drive shaft can also accommodate the space-saving model of an impulse generator, which can be used for regulated drives. This impulse generator can be integrated into the space of the motor housing or formed as a part of the motor shaft bearing.

The following is a closer explanation of the invention using examples of preferred construction designs.

BRIEF DESCRIPTION OF THE DRAWING FIGURES

Figure 3A:
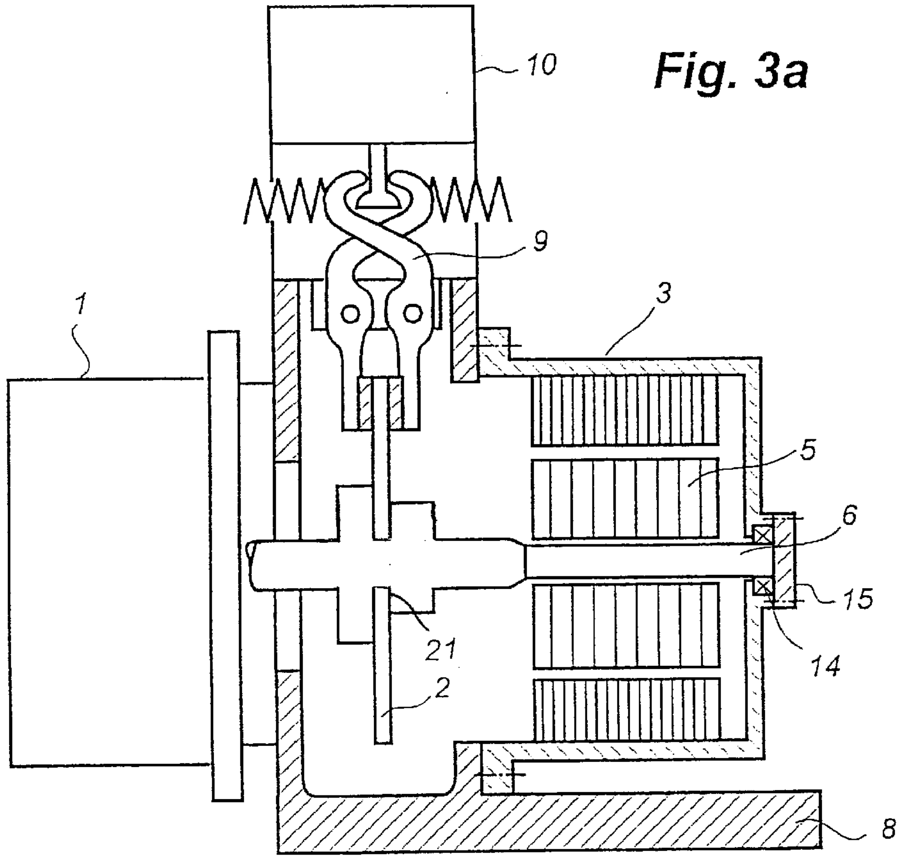
Figure 3B:
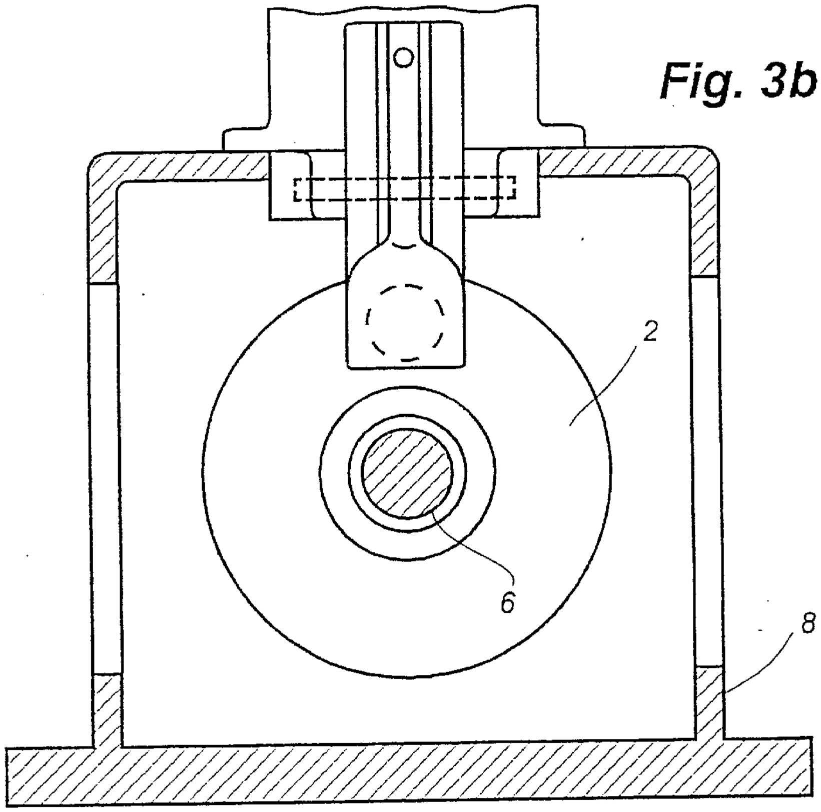
Figure 4A:
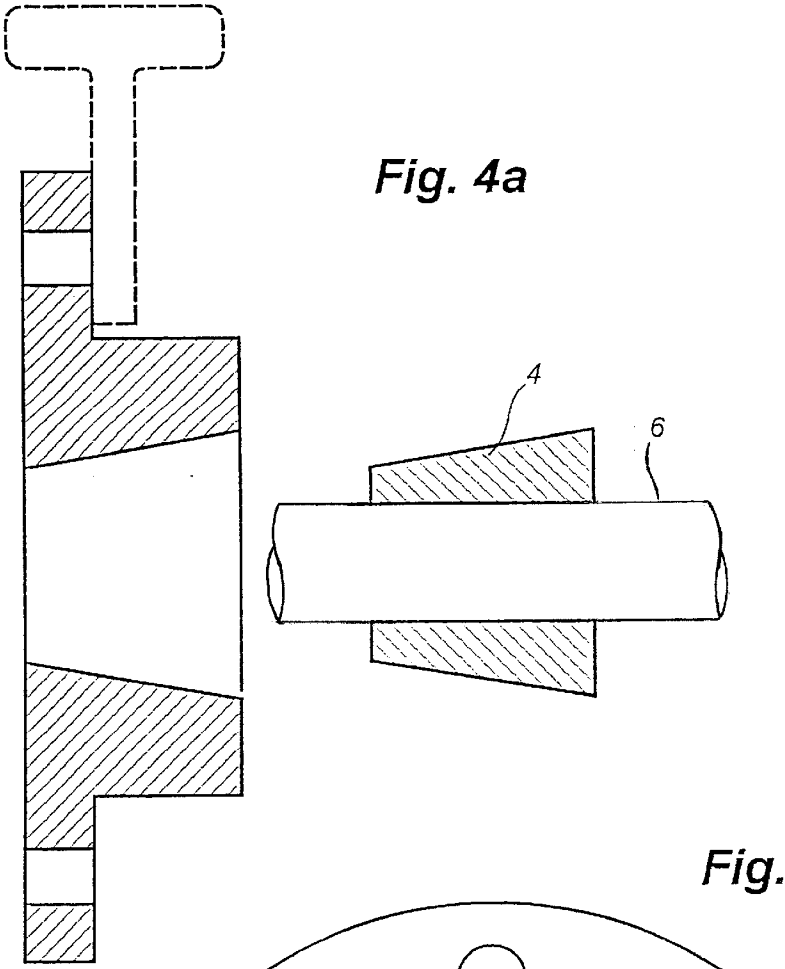
Figure 4B:
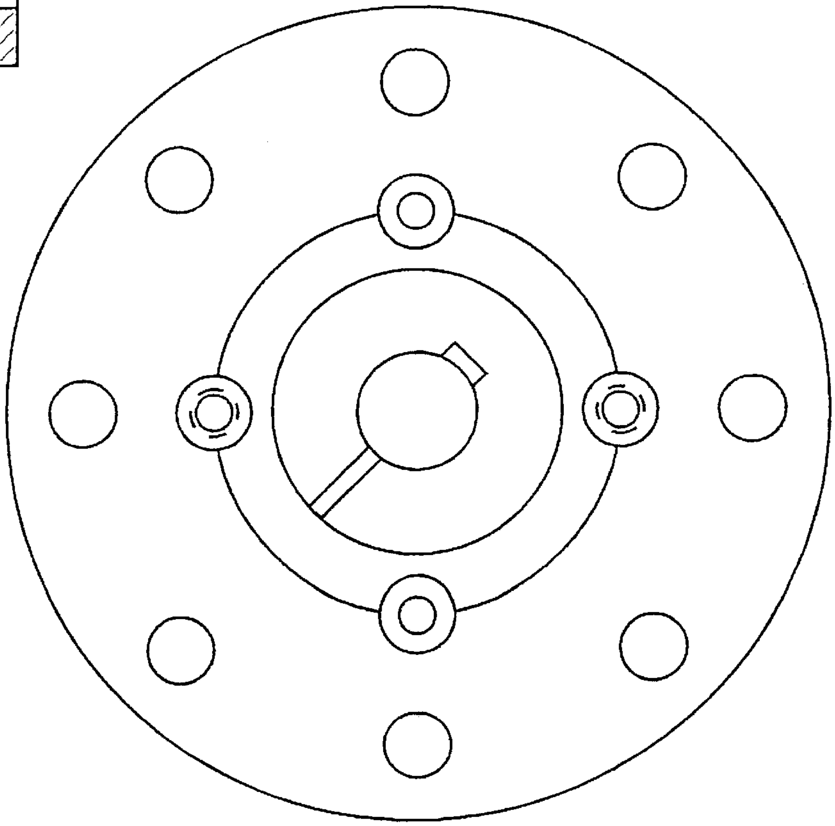

FIGS. 3*a* and 3*b* are the longitudinal section and the cross section of a drive unit with a disk brake; and FIGS. 4*a* and 4*b* are the longitudinal section and the cross section of a cone clutch for fastening the brake body to the shaft.

DETAILED DESCRIPTION OF THE PREFERRED EMBODIMENTS

Figure 1:
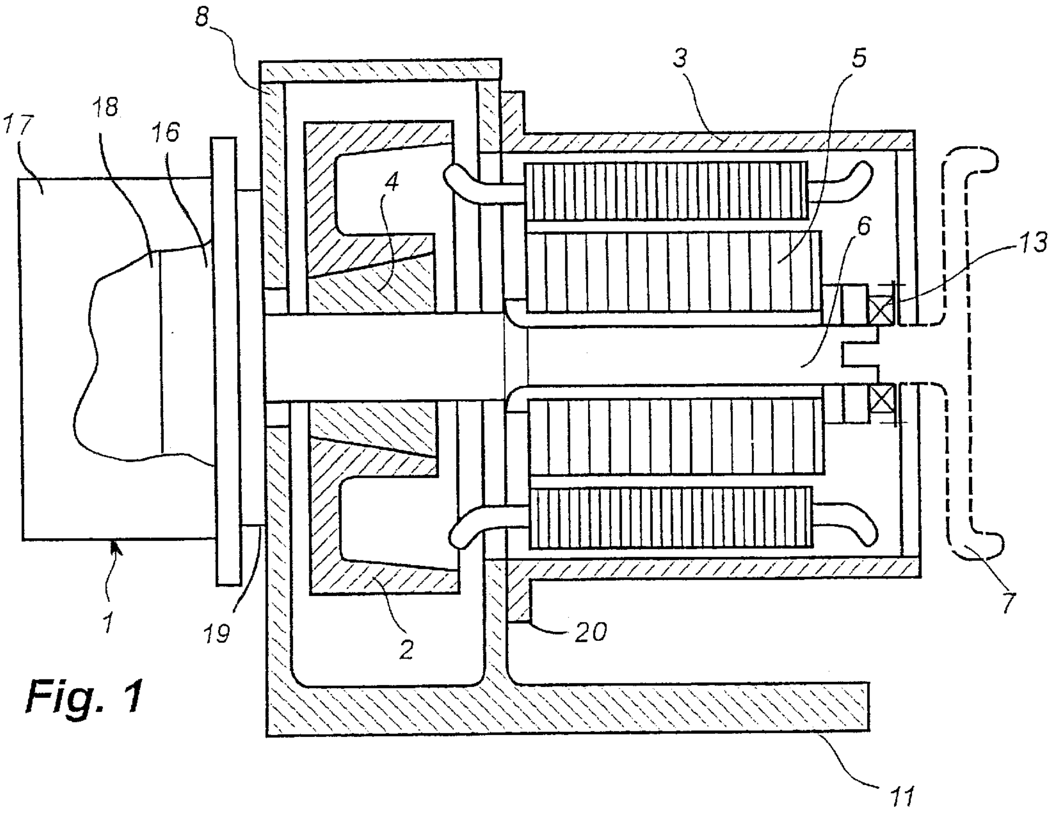
FIG. 1 is the vertical longitudinal section of a drive unit as set forth in the invention.

FIG. 1 shows schematically a drive unit for a hoist with the basic assembly parts drive 1, brake 2, and motor 3, which are aligned on a single axis. The drive 1 is formed as planetary gear 1 and contains in its housing a pulley, not shown, for the ropes of the hoist. Reference numeral 8 identifies a brake housing, which may be a single unit and joined to a rigid base plate 11. The base plate 11 continues underneath the motor 3 and is anchored to a foundation, not shown. The planetary gear 16 is flanged 19 with its stationary part to the left side of the brake housing 8. In the same manner, the housing of the motor 3 is flanged 20 to the right side of the brake housing 8. The rotor 5 of the motor 3, the brake body of the brake 2, and the inside diameter (entry part) of the planetary gear 16 rest on a common shaft 6, which runs as a continuing shaft through the whole drive unit. On the motor side, a hand wheel 7 for emergency use can be placed on the free end of the shaft 6. Furthermore, the free end of the shaft accommodates an impulse generator 13, which is braced on the inside of the motor housing cover. The brake body disk brake or brake drum is fastened with a familiar cone clutch 4 to the shaft 6, as shown schematically in FIGS. 4*a*, 4*b*. Alternatively, brake 2 (FIG. 3*a*) can be attached to shaft by way of a flange 21 integrally formed with shaft 6. As seen in FIG. 3*a*, the free end of the shaft can be inserted into a support bearing 14, which itself can include as an impulse generator. The support bearing 14 or the free end of the shaft can be covered with a removable cap 15. This cap can contain a safety contact to ensure that the drive unit 1 cannot be engaged while the hand wheel 7 is being attached.

Figure 2:
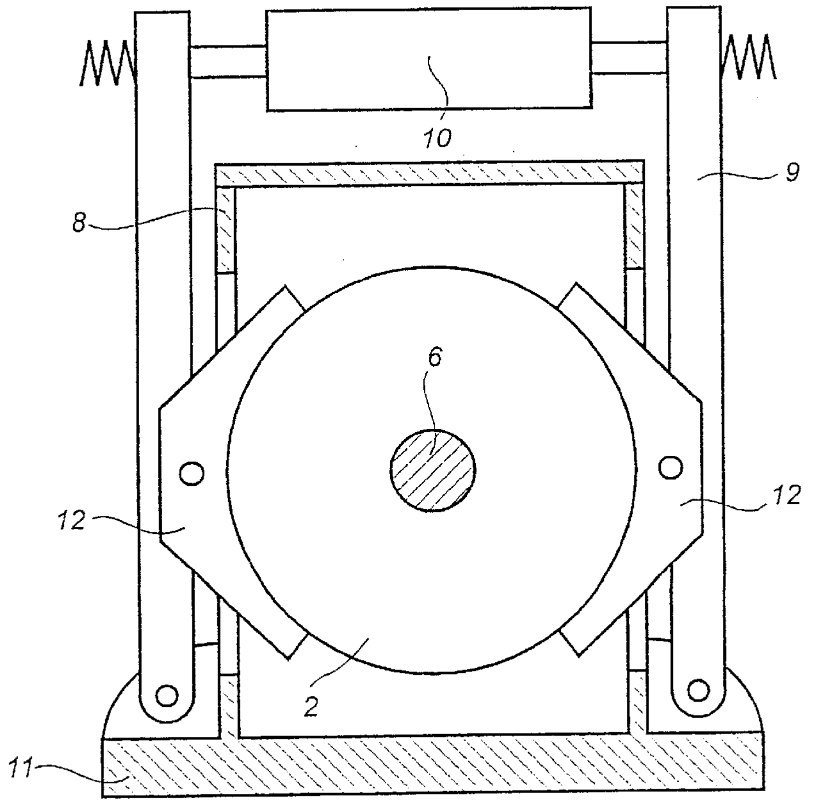
FIG. 2 is the cross section of a brake housing with a drum brake.

Various styles can be used for the brake. FIGS. 1 and 2 show a drum brake, where the brake shoes 12 are pressed to the outer circumference of the brake body with levers 9 and the brake cylinder 10. In contrast, FIGS. 3*a* and 3*b* show a disk brake, also with levers and a brake cylinder 10.

In both cases, the levers 9 absorbing the braking forces are fastened to the brake body 8. They can also be fastened to the foundation, independently from the brake housing 8, so that the braking forces from the moving masses are not transmitted to the brake housing 8. In that case, it is possible to assemble and install the brake unit on its own support as a complete component.

Instead of the planetary gear of the model in the previous example, a different drive can be used. Then it is possible to flange a back geared motor as a modular unit to one side of the brake housing and add a pulley for the carrying ropes on the other protruding end of the shaft 6.

The essential advantages of the drive unit as set forth in the invention include a much shorter model length because the coupling is eliminated, the shaft is continuously aligned, and because the brake is fastened on the shaft near the drive and/or pulley bearing, which reduces and absorbs vibrations better so that the customary motor support bearing can be eliminated. The brake housing may also include openings in the sides for monitoring the brake and making it accessible, so that wear and tear can be observed and a simple change of the brake parts is possible.

What is claimed is:

1. A drive unit for a hoist, comprising:

a motor;

a gear;

a brake housing that serves as a support, onto which at least one of said motor and said gear is flanged;

a brake located within said brake housing, said brake is a drum brake; and a continuous shaft that serves as a motor shaft as well as a gear shaft; and wherein said brake is fastened to said shaft, wherein at least one of said motor and said gear are flanged to said brake housing, and wherein said motor and said gear each extend from said brake housing in a cantilever manner.

2. A drive unit for a hoist, comprising:

a motor;

a gear;

a brake housing that serves as a support, onto which at least one of said motor and said gear is flanged;

a brake located within said brake housing; and a continuous shaft that serves as a motor shaft as well as gear shaft; and wherein said brake is fastened to said shaft, and wherein said brake is fastened to a special flange formed as an integral part of said shaft.

3. A drive unit for a hoist, comprising:

a motor;

a gear;

a brake housing that serves as a support, onto which at least one of said motor and said gear is flanged;

a brake located within said brake housing; and a continuous shaft that serves as a motor shaft as well as gear shaft; and wherein said brake is fastened to said shaft and wherein said brake housing has openings through which said brake is accessible.

4. A drive unit for a hoist, comprising:

a motor;

a planetary gear;

a brake housing that serves as a support, onto which at least one of said motor and said gear is flanged;

a brake located within said brake housing; and a continuous shaft that serves as a motor shaft as well as gear shaft wherein said brake is fastened to said shaft.

5. A drive unit for a hoist, comprising:

a motor;

a gear designed as a precision gear with zero backlash;

a brake housing that serves as a support, onto which at least one of said motor and said gear is flanged;

a brake located within said brake housing; and a continuous shaft that serves as a motor shaft as well as gear shaft wherein said brake is fastened to said shaft.

6. A drive unit for a hoist, comprising:

a motor;

a plurality of gears that include a precision gear;

a brake housing that serves as a support, onto which at least one of said motor and at least one of said gears is flanged;

a brake located within said brake housing; and a continuous shaft that serves as a motor shaft as well as gear shaft wherein said brake is fastened to said shaft.

7. A drive unit for a hoist, comprising:

a motor;

a gear;

a brake housing that serves as a support, onto which at least one of said motor and said gear is flanged;

a brake located within said brake housing;

a continuous shaft that serves as a motor shaft as well as gear shaft wherein said brake is fastened to said shaft; and a carrying medium including a pulley adapted to support ropes of a hoist wherein said gear has a power take-off shaft on its power take-off side which is shaped to form a receptacle for said carrying medium.

8. A drive unit according to claim 7, wherein said gear has an opening to accommodate said power take-off shaft.

9. A drive unit for a hoist, comprising:

a motor;

a gear;

a brake housing that serves as a support, onto which at least one of said motor and said gear is flanged;

a brake located within said brake housing;

a continuous shaft that serves as a motor shaft as well as gear shaft wherein said brake is fastened to said shaft; and an impulse generator in operable connection with said continuous shaft therein.

10. A drive unit for a hoist, comprising:

a motor;

a gear;

a brake housing that serves as a support, onto which at least one of said motor and said gear is flanged;

a brake located within said brake housing;

a continuous shaft that serves as a motor shaft as well as gear shaft wherein said brake is fastened to said shaft; and a support bearing that includes an impulse generator, and that receives said continuous shaft therein.

11. A drive unit for a hoist, comprising:

a motor;

a gear;

a brake housing that serves as a support, onto which at least one of said motor and said gear is flanged;

a brake located within said brake housing;

a continuous shaft that serves as a motor shaft as well as gear shaft; and a cone clutch that fastens said brake to said shaft.

* * * * *

UNITED STATES PATENT AND TRADEMARK OFFICE

CERTIFICATE OF CORRECTION

PATENT NO. : 6,146,303
DATED : November 14, 2000
INVENTOR(S) : Wittur et al.

It is certified that error appears in the above-identified patent and that said Letters Patent is hereby corrected as shown below:

Col. 1, line 5;
"ain" should be --main--;

Col. 1, line 7;
"rake" should be --brake--;

Col. 1, line 9;
"hose" should be --those--;

Col. 2, lines 18-20;
Change "the drive 1 is formed as planetary gear 1 and contains in its housing a pulley, not shown, for the ropes of the hoist." to --the drive 1, is formed as planetary gear 16 and contains in its housing 17 a carrying medium 18, such as a pulley adapted for carrying the ropes of the hoist.--;

Col. 2, line 38;
After "to shaft" insert --6--;

Col. 2, line 41;
Change "be shaped as" to --include--;

Signed and Sealed this

Twenty-ninth Day of May, 2001

Attest:

Nicholas P. Godici

NICHOLAS P. GODICI

*Attesting Officer* *Acting Director of the United States Patent and Trademark Office*